United States Patent
Kuo et al.

(10) Patent No.: US 11,124,257 B2
(45) Date of Patent: Sep. 21, 2021

(54) CONCEALABLE SCOOTER

(71) Applicant: Ford Global Technologies, LLC, Dearborn, MI (US)

(72) Inventors: James Yu-Hsin Kuo, Farmington Hill, MI (US); Hyunsoo Kim, Shelby Township, MI (US); Chelsia Ka Po Lau, Ann Arbor, MI (US); Jack Li, Putuo (CN); Euishik Bang, Huangpu (CN)

(73) Assignee: Ford Global Technologies, LLC, Dearborn, MI (US)

( * ) Notice: Subject to any disclaimer, the term of this patent is extended or adjusted under 35 U.S.C. 154(b) by 458 days.

(21) Appl. No.: 16/087,674

(22) PCT Filed: Jul. 15, 2016

(86) PCT No.: PCT/US2016/042431
§ 371 (c)(1),
(2) Date: Sep. 24, 2018

(87) PCT Pub. No.: WO2017/164913
PCT Pub. Date: Sep. 28, 2017

(65) Prior Publication Data
US 2020/0298927 A1    Sep. 24, 2020

Related U.S. Application Data

(60) Provisional application No. 62/312,092, filed on Mar. 23, 2016.

(51) Int. Cl.
*B62K 15/00* (2006.01)
*B62J 25/04* (2020.01)
(Continued)

(52) U.S. Cl.
CPC ............. *B62K 15/006* (2013.01); *B62J 25/04* (2020.02); *B62J 43/10* (2020.02); *B62K 11/02* (2013.01); *B62K 11/14* (2013.01); *B62K 2202/00* (2013.01)

(58) Field of Classification Search
CPC ............. A45C 2009/005; A45C 5/146; B62B 2206/006; B62D 61/02; B62K 15/00;
(Continued)

(56) References Cited

U.S. PATENT DOCUMENTS 3,316,993 A    5/1967  Weitzner
3,934,669 A *  1/1976  Adams .................... B60K 1/00
                                                    180/208
(Continued)

FOREIGN PATENT DOCUMENTS

CN    102530160 A    7/2012
RU        75847 U    8/2008

OTHER PUBLICATIONS

Russian Office Action dated Oct. 16, 2019 regarding Application No. RU2018137117 (6 pages).
(Continued)

*Primary Examiner* — Minnah L Seoh
*Assistant Examiner* — Hosam Shabara
(74) *Attorney, Agent, or Firm* — Brandon Hicks; Bejin Bieneman PLC

(57) ABSTRACT

A scooter includes a platform, a shell movably coupled to the platform via a gripper of the shell and a grip surface of the platform, and front and rear wheels rotatably coupled to the platform. The shell defines a cavity, and the platform is movable into and out of the cavity. The scooter may include a retractable pole coupled to the platform and a handlebar
(Continued)

coupled to the retractable pole. The retractable pole may be coupled to and steer the front wheel. The shell may include one or two foldable decks.

20 Claims, 3 Drawing Sheets

(51) Int. Cl.
*B62K 11/14* (2006.01)
*B62J 43/10* (2020.01)
*B62K 11/02* (2006.01)

(58) Field of Classification Search
CPC ........ B62K 11/00; B62K 11/14; B62K 21/12; B62K 2202/00; B62K 3/002; B62J 25/04
USPC .................................... 180/208, 220; 280/37
See application file for complete search history.

(56) References Cited

U.S. PATENT DOCUMENTS

| | | | |
|---|---|---|---|
| 4,094,374 A | 6/1978 | Adams | |
| 4,913,252 A | 4/1990 | Bartley et al. | |
| 5,097,922 A | 3/1992 | Stagi | |
| 7,077,229 B2 | 7/2006 | Lee | |
| 8,282,113 B2 | 10/2012 | Veal et al. | |
| 9,033,350 B2 * | 5/2015 | Porri | B62J 9/00 280/87.042 |
| 9,090,274 B1 * | 7/2015 | Arjomand | B62K 3/002 |
| 2005/0173175 A1 | 8/2005 | Lee | |
| 2011/0193304 A1 | 8/2011 | Turner | |
| 2013/0001911 A1 | 1/2013 | Porri | |
| 2015/0246705 A1 | 9/2015 | Sharkan et al. | |

OTHER PUBLICATIONS

Notification of Transmittal of International Search Report and Written Opinion of International Searching Authority dated Oct. 6, 2016 regarding International Application No. PCT/US2016/42431 (13 pages).
Green Energy Motors Corp., "Commute-Case", 2014-2015 (3 pages).
MiniHummer, "Transforming Briefcase Electric Scooter", YouTube (1 pages).

* cited by examiner

CONCEALABLE SCOOTER

CROSS-REFERENCE TO RELATED APPLICATIONS

The subject patent application claims priority to and all the benefits of U.S. Provisional Patent Application No. 62/312,092 which was filed on Mar. 23, 2016, which is herein incorporated by reference in its entirety.

BACKGROUND

Scooters can be a useful mode of transport in an urban environment. Scooters have enough power and size to transport a user and some cargo for that user. Their small size relative to other modes of transportation, however, make scooters useful for navigating through a crowded environment.

Scooters can be particularly useful for what is called the "last mile." The reach of mass transit such as buses or subways often does not extend all the way to the ultimate destination of the user. Thus, the user faces the issue of transportation from the closest stop on mass transit to his or her ultimate destination.

But scooters can be difficult to bring on mass transit, which can be a crowded environment. Scooters can be bulky and may have protruding parts that inconvenience the user or those around the user.

DETAILED DESCRIPTION

Figure 1C:
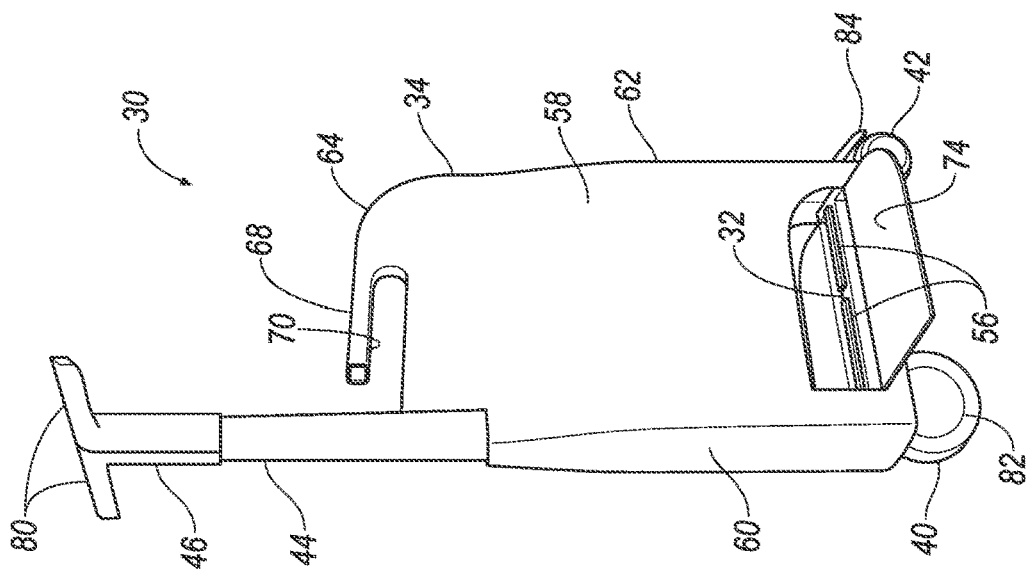
FIG. 1C is a perspective view of the scooter in the rideable state.

With reference to the Figures, wherein like numerals indicate like parts throughout the several views, a scooter 30 includes a platform 32, a shell 34 movably coupled to the platform 32 via a gripper 36 of the shell 34 and a grip surface 38 of the platform 32, and front and rear wheels 40, 42 rotatably coupled to the platform 32. The shell 34 defines a cavity 66, and the platform 32 is movable into and out of the cavity 66. The scooter 30 may include a retractable pole 44 coupled to the platform 32 and a handlebar 46 coupled to the retractable pole 44. The retractable pole 44 may be coupled to and steer the front wheel 40. The shell 34 may include one or two foldable decks 48.

The scooter 30, when not being ridden by a user, is easy to carry and unobtrusive. The protruding parts of a typical scooter, such as the handlebar, wheels, and deck, are enclosed in a package similar in size to a shopping bag. The scooter 30 easily transforms from that easy-to-carry state into a state in which the scooter 30 can be ridden by the user.

Figure 3:
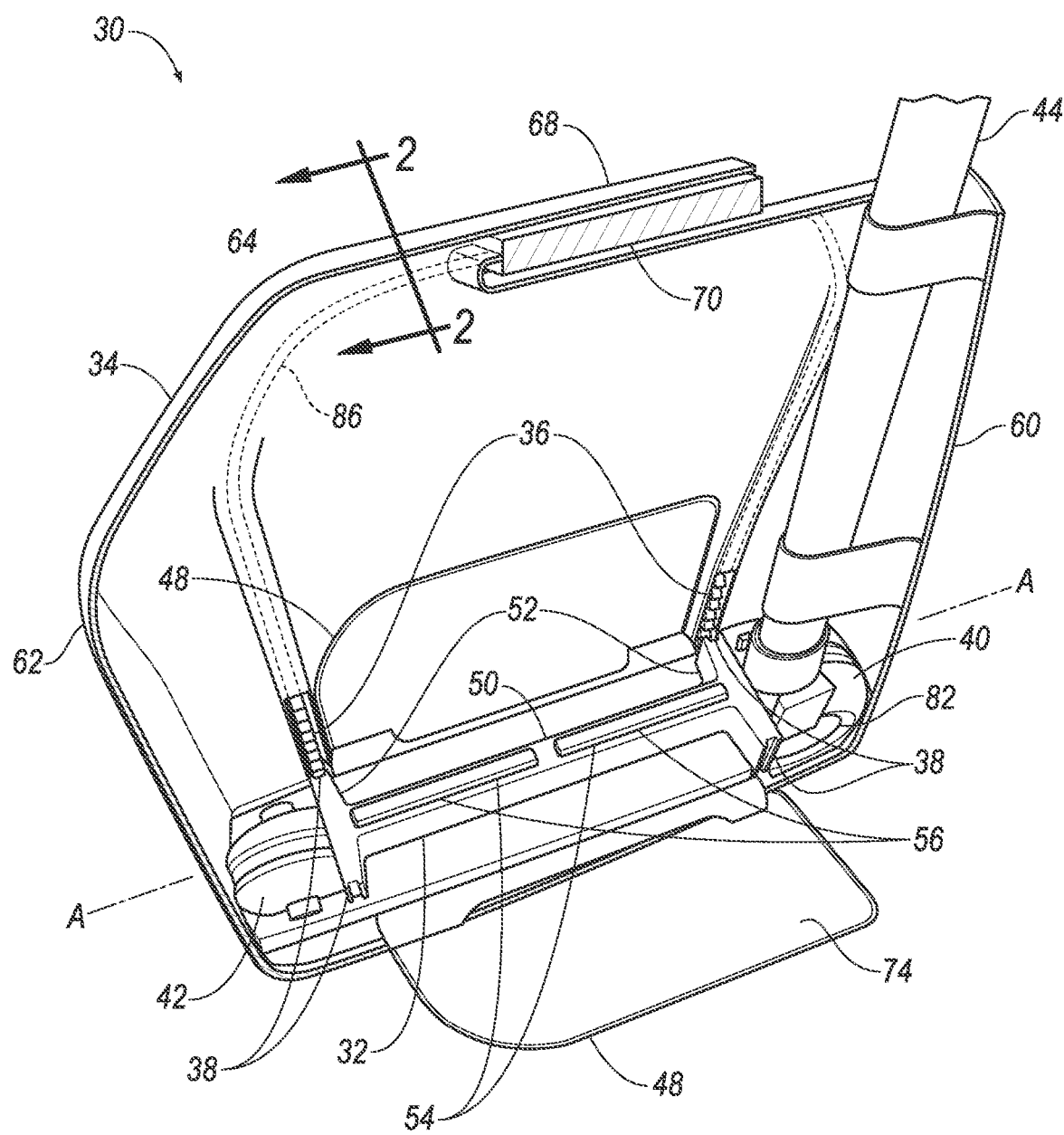
FIG. 3 is a cutaway view of an interior of the scooter.

With reference to FIG. 3, the platform 32 may have an "I" shape with a longitudinal segment 50 extending from a front end at a front of the scooter 30 to a rear end at a rear of the scooter 30 and two transverse segments 52 attached to the front end and the rear end. The platform 32 may include slots 54 configured to receive one or more batteries 56.

The platform 32 may be movably coupled to the shell 34. The platform 32 defines a longitudinal axis A and is elongated along the longitudinal axis A. The longitudinal axis A of the platform 32 is generally parallel to the direction of the longitudinal segment 50 and to a forward direction of travel for the scooter 32.

The platform 32 is translationally movable into and out of the cavity 66. The translational movement of the platform 32 relative to the shell 34 is transverse to the longitudinal axis A, e.g., perpendicular to the longitudinal axis A. Specifically, the platform 32 and the shell 34 move vertically relative to each other. The platform 32 is movable relative to the shell 34 between a raised position concealing the wheels 40, 42 in the cavity 66 and a lowered position exposing the wheels 40, 42. The lowered position is shown in FIG. 1A, and the raised position is shown in FIGS. 1B-C.

The batteries 56 may be lithium-ion batteries or any other suitable type. The batteries 56 may be coupled to the shell 34. Specifically, the batteries 56 may be inserted or coupled to the platform 32 and thus indirectly coupled to the shell 34. The batteries 56 may be detachable from the platform 32. Specifically, the batteries 56 may be removable and replaceable in the slots 54. The batteries 56 may be rechargeable. The batteries 56 may be specialized for short- or long-range trips. The user may choose to insert one battery 56 for a short-range trip to make the scooter 30 lighter or to insert multiple batteries 56 for a long-range trip.

The transverse segments 52 of the platform 32 have ends that may include grip surfaces 38. The grip surfaces 38 may be rough or high-friction relative to the platform 32. The grip surfaces 38 may be any surface configured to engage the grippers 36 of the shell 34, as set forth further below.

Figure 1B:
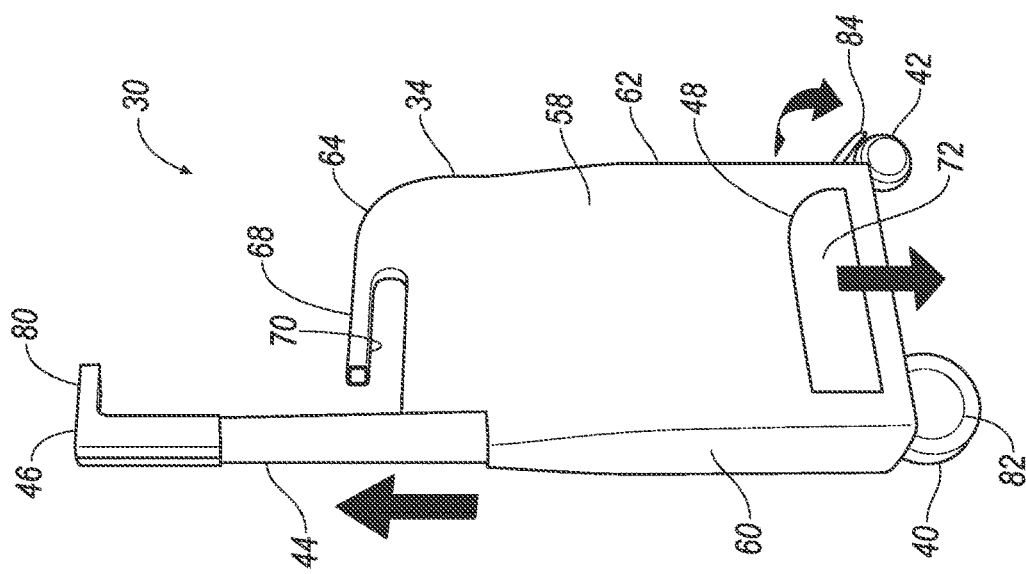
FIG. 1B is a perspective view of the scooter transitioning from the carryable state to a rideable state.
Figure 1A:
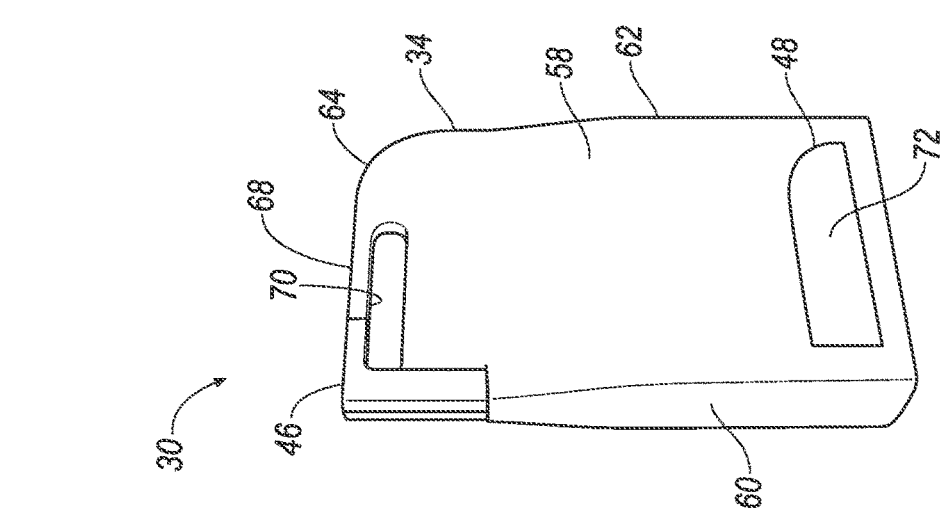
FIG. 1A is a perspective view of a scooter in a carryable state.

With reference to FIGS. 1A-C, the shell 34 includes two side panels 58 aligned with the longitudinal segment 50 of the platform 32, a front panel 60, and a back panel 62. The front and back panels 60, 62 extend from one side panel 58 to the other side panel 58. The side panels 58 include a top edge 64 spaced from the platform 32. The top edges 64 of the side panels 58 may meet, or the side panels 58 may be parallel.

The shell 34 may be pliable relative to the platform 32 or may be rigid like the platform 32. The shell 34 may be formed of silicone rubber. Alternatively, the shell 34 may be formed of carbon fiber or any other suitable material. The shell 34 may be detachable from the platform 32. The detachability of the shell 34 allows a user to customize which shell 34 is coupled to the scooter 30.

Figure 2:
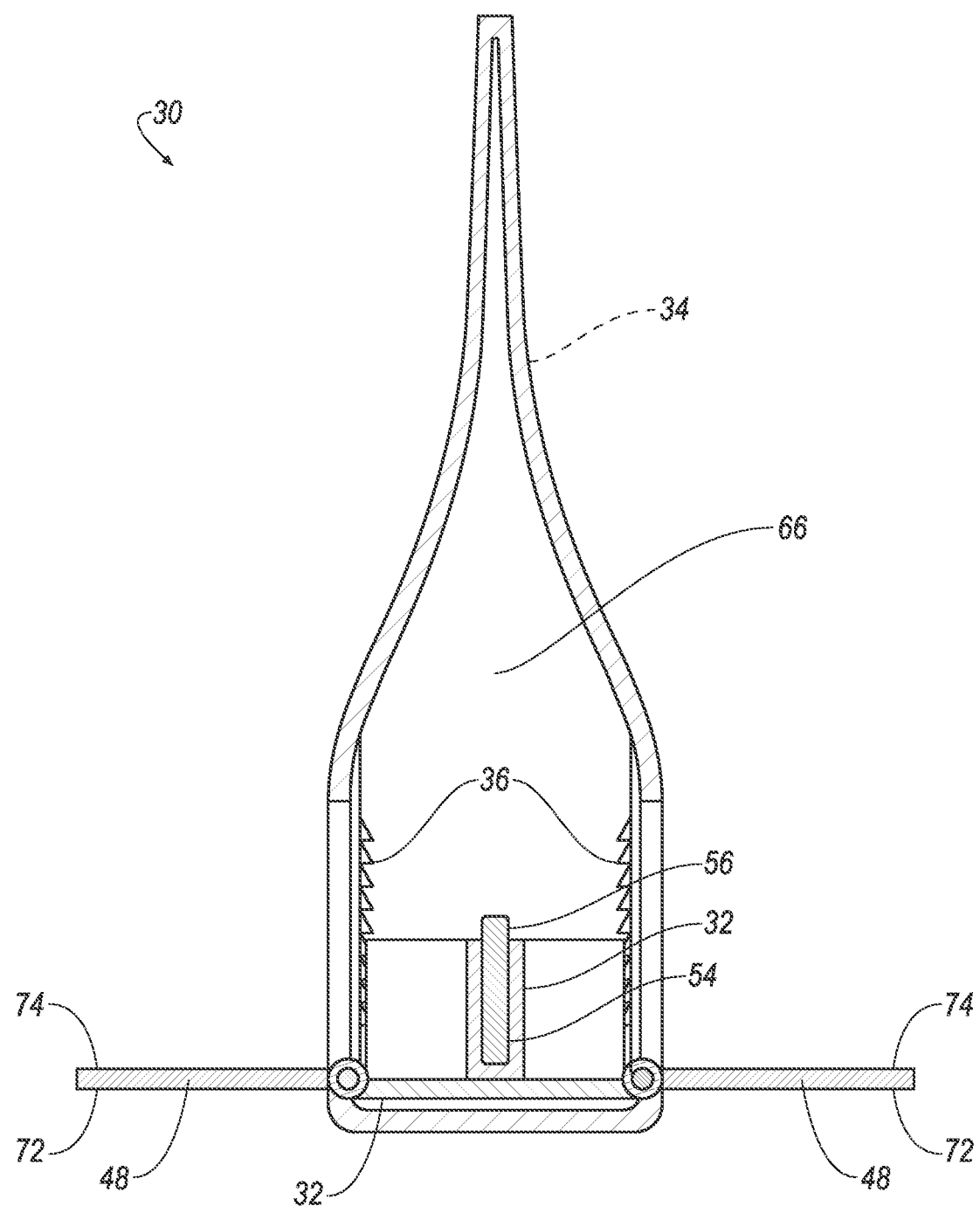
FIG. 2 is a cross-sectional view of the scooter along line 2 of FIG. 3.

With reference to FIG. 2, the shell 34 may enclose a cavity 66. The cavity 66 may be situated inside the shell 34. The cavity 66 is an empty space that allows the platform 32 to partially or fully retract into the shell 34 and allows the user to store items inside the scooter 30.

With reference to FIG. 3, and as introduced above, the shell 34 include the gripper 36, and the platform 32 includes the grip surface 38 engageable with the gripper 36. Specifically, the side panels 58 of the shell 34 may include grippers 36 retractably coupled to the side panels 58. The grippers 36 may be, for example, a sawtooth pattern configured to, when engaged with the grip surface 38 of the platform 32, prevent the shell 34 from moving relative to the platform 32. When the gripper 36 of the shell 34 is retracted and thus not engaged with the grip surface 38 of the platform 32, the platform 32 can freely slide relative to the shell 34. The gripper 36 may alternatively be any other mechanism selectively allowing the platform 32 and/or the wheels 40, 42 to move vertically relative to the shell 34.

The scooter 30 may include a handle 68 attached at the top edges 64 of the side panels 58 of the shell 34. With reference to FIGS. 1A-C, the handle 68 may be disposed at the top edges 64 of the side panels 58 of the shell 34. The handle 68 may be a section removed from the side panels 58 to allow a hand of the user to grasp the top edges 64 of the side panels 58. Alternatively, the handle 68 may be a grip extending from the top edges 64 of the side panels 58.

With reference to FIG. 3, the scooter 30 may include a release trigger 70 coupled to the handle 68 and in communication with the gripper 36. The gripper 36 is in communication with the release trigger 70. The release trigger 70 may be a trigger squeezable by the user relative to the handle 68, for example, a segment extending along the handle 68 that may be pressed into the handle 68. When the release trigger 70 is pressed, the release trigger 70 pulls a cable 86, e.g., a Bowden cable, connected to the gripper 36. The retraction of the cable 86 pulls the gripper 36 away from the grip surface 38, allowing the shell 34 to move relative to the platform 32.

With reference to FIGS. 1A-C, the side panels 58 of the shell 34 may include foldable decks 48. Each of the two side panels 58 may include a foldable deck 48, or alternatively only one of the side panels 58 may include the foldable deck 48. The foldable decks 48 may be hingedly attached to the side panels 58 and rotatable from a closed position adjacent the side panel 58 to a footrest position transverse to the side panel 58. The closed position is shown in FIGS. 1A-B, and the footrest position is shown in FIG. 1C.

In the closed position, an exterior side 72 of the foldable deck 48 may be flush with the side panel 58 and/or may abut the side panel 58. The foldable deck 48 may enclose the cavity 66 in the closed position. The foldable decks 48 may include the exterior sides 72 with the same appearance as the side panel 58 of the shell 34, that is, the exterior sides 72 of the foldable decks 48 may be formed of the same material as the side panel 58, e.g., silicone, and/or may be the same color as the side panel 58.

In the footrest position, the foldable deck 48 may be positioned horizontally, transverse to the side panel 58. An interior side 74 of the foldable deck 48 opposite the exterior side 72 may be facing upward in the footrest position. The interior side 74 may serve as a footrest for the user while the scooter 30 is in operation. The foldable decks 48 may include the interior sides 74 with a high surface roughness relative to the exterior side 72. The high roughness may reduce the likelihood that the foot of the user slips during operation.

The handlebar 46 may include the retractable pole 44 and two handlebar segments 80. The handlebar segments 80 may be coupled to an end of the retractable pole 44.

The retractable pole 44 may be oriented at a right angle or an acute angle relative to the platform 32. The retractable pole 44 may be slidably coupled to the shell 34. The retractable pole 44 is movable from a retracted position concealed within the shell 34 to an extended position extending from the shell 34. In other words, the retractable pole 44 may move from a retracted position, in which the retractable pole 44 is disposed inside the shell 34, to an extended position, in which the retractable pole 44 extends from the shell 34.

The handlebar segments 80 may be coupled to the retractable pole 44. The handlebar 46 may be foldable from a stowed position to a steering position. Specifically, the handlebar 46 may include the two handlebar segments 80 rotatable from a parallel position to an aligned position. The handlebar segments 80 may rotate from a position in line with the platform 32 and parallel to each other, in which case the handlebar 46 is in the stowed position, to a position transverse to the platform 32 and in line with each other, in which case the handlebar 46 is in the steering position. If the retractable pole 44 is in the retracted position and the handlebar 46 is in the stowed position, the handlebar 46 may be aligned with the handle 68.

With reference to FIG. 3, the scooter 30 may include a plurality of wheels 40, 42 rotatably coupled to the platform 32. The plurality of wheels 40, 42 may be two wheels, the front wheel 40 and the rear wheel 42. The front wheel 40 and the rear wheel 42 may be spaced from each other along the longitudinal axis.

The front wheel 40 is coupled to the platform 32 and moves with the platform 32 relative to the shell 34 between the raised position and the lowered position. The front wheel 40 is also coupled to the retractable pole 44 so that the front wheel 40 turns in unison with the rotation of the retractable pole 44. Thus, the retractable pole 44 steers the front wheel 40. The front wheel 40 may be formed of rubber, plastic, or any other suitable material.

The rear wheel 42 is coupled to the platform 32 at the rear end of the scooter 30. The rear wheel 42 may be formed of rubber, plastic, or any other suitable material. The rear wheel 42 may be coupled directly to the platform 32 or may be coupled via a pivotable extension 84. If the rear wheel 42 is coupled directly to the platform 32, the rear wheel 42 may be exposed when the shell 34 is in the raised position, i.e., moves with the platform 32 relative to the shell 34 between the raised position and the lowered position.

Alternatively, with reference to FIGS. 1B-C, the pivotable extension 84 may pivot away from the platform 32 when the shell 34 is in the raised position. The extension 84 may couple the rear wheel 42 to the shell 34, and the extension 84 may be pivotable relative to the shell 34. The rear wheel 42 may be slidably coupled to the pivotable extension 84. The position of the rear wheel 42 may be movable by the user by use of a button (not shown) in communication with the pivotable extension 84, for example, an embedded gear mechanism capable of sliding the rear wheel 42 relative to the pivotable extension 84

A motor 82 may be driveably coupled to one or both of the wheels 40, 42. As one example the motor 82 may be driveably coupled to the front wheel 40. The motor 82 may be in electrical communication with the batteries 56. The motor 82 may be mounted to the front wheel 40. Specifically, the motor 82 may be mounted in the front wheel 40. The motor 82 may draw power from the batteries 56 in order to propel the front wheel 40. Alternatively, the motor 82 may be mounted in the rear wheel 42 or may be mounted to the platform 32 and driveably coupled to the front wheel 40 or rear wheel 42.

The scooter 30 transitions from a carryable state (as shown in FIG. 1A) to a rideable state (as shown in FIG. 1C). When the scooter 30 is in the carryable state, the retractable pole 44 is in the retracted position, the handlebar 46 is in the stowed position, the platform 32 is in the raised position, and the foldable decks 48 are in the closed position. The scooter 30 may be unobtrusively carried by the user. To transition the scooter 30 from the carryable state to the rideable state, the user may, in any order, fold down the foldable decks 48, lower the platform 32 from the shell 34 by pushing the release trigger 70, extend the retractable pole 44, and fold out the handlebar 46. When the scooter 30 is in the rideable state, the retractable pole 44 is in the extended position, the handlebar 46 is in the steering position, the platform 32 is in the lowered position, and the foldable decks 48 are in the footrest position. The scooter 30 may be driven by the user. To transition the scooter 30 from the rideable to the carryable state, the user may, in any order, fold up the foldable decks 48, raise the platform 32 by pushing the release trigger 70, retract the retractable pole 44, and fold in the handlebar 46.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A scooter comprising:
   a shell including two side panels defining a cavity therebetween;
   a handlebar coupled to the shell and retractable into the shell;
   a platform elongated along a longitudinal axis, the platform coupled to the shell and translationally movable into and out of the cavity; and
   a plurality of wheels rotatably coupled to the platform;
   wherein the plurality of wheels includes a front wheel and a rear wheel spaced from each other along the longitudinal axis.

2. The scooter of claim 1, wherein the platform is translationally movable into and out of the cavity transverse to the longitudinal axis.

3. The scooter of claim 1, further comprising decks hingedly attached to the side panels and rotatable from a closed position adjacent the side panel to a footrest position transverse to the side panel.

4. The scooter of claim 3, wherein the decks include an exterior side with the same appearance as the side panel of the shell.

5. The scooter of claim 3, wherein the decks include an interior side with a high surface roughness relative to the exterior side.

6. The scooter of claim 1, wherein the shell includes a gripper and the platform includes a grip surface engageable with the gripper.

7. The scooter of claim 6, wherein the gripper is in communication with a release trigger.

8. The scooter of claim 6, wherein at least one of the gripper and the grip surface has a surface with a sawtooth pattern.

9. The scooter of claim 1, wherein the shell is detachable from the platform.

10. The scooter of claim 1, further comprising a battery detachably coupled to the platform.

11. The scooter of claim 1, wherein the platform is translationally movable relative to the shell between a raised position concealing the wheels in the cavity and a lowered position exposing the wheels.

12. The scooter of claim 1, wherein the shell is formed of silicone rubber.

13. The scooter of claim 1, further comprising a handle attached at top edges of the side panels of the shell.

14. The scooter of claim 1, wherein the handlebar includes a retractable pole coupled to the shell.

15. The scooter of claim 14, wherein the retractable pole is movable from a retracted position concealed within the shell to an extended position extending from the shell.

16. The scooter of claim 1, wherein the handlebar is foldable from a stowed position to a steering position.

17. The scooter of claim 1, wherein the handlebar includes two handlebar segments rotatable from a parallel position to an aligned position.

18. The scooter of claim 1, further comprising a motor drivably mounted to one of the wheels.

19. A scooter comprising:
    a shell including two side panels defining a cavity therebetween;
    a handlebar coupled to the shell and retractable into the shell;
    a platform elongated along a longitudinal axis, the platform coupled to the shell and translationally movable into and out of the cavity; and
    a plurality of wheels rotatably coupled to the platform;
    wherein the platform is translationally movable relative to the shell between a raised position concealing the wheels in the cavity and a lowered position exposing the wheels.

20. A scooter comprising:
    a shell including two side panels defining a cavity therebetween;
    a handlebar coupled to the shell and retractable into the shell;
    a platform elongated along a longitudinal axis, the platform coupled to the shell and translationally movable into and out of the cavity; and
    a plurality of wheels rotatably coupled to the platform;
    wherein the shell is detachable from the platform.

* * * * *